US008185453B1

(12) United States Patent
Baeck et al.

(10) Patent No.: US 8,185,453 B1
(45) Date of Patent: May 22, 2012

(54) CONTEXTUAL ACCESS TO WORKFLOW FUNCTIONALITY

(75) Inventors: Aline Baeck, Sunnyvale, CA (US); Roy Goldman, Cupertino, CA (US); Lisa Holzhauser, San Carlos, CA (US); Miriam Nga-Shun Vu, San Francisco, CA (US); Yin Yin Wong, San Francisco, CA (US); Karen Peacock, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 1555 days.

(21) Appl. No.: 11/386,581

(22) Filed: Mar. 21, 2006

(51) Int. Cl.
*G07B 17/00* (2006.01)
*G06F 15/02* (2006.01)
*G06F 21/00* (2006.01)
*G07F 19/00* (2006.01)

(52) U.S. Cl. ............... 705/30; 705/32; 705/34; 705/40

(58) Field of Classification Search ............ 705/30, 705/32, 34, 40
See application file for complete search history.

(56) References Cited

U.S. PATENT DOCUMENTS

| 4,393,394 | A | | 7/1983 | McCoy |
|---|---|---|---|---|
| 5,093,787 | A | | 3/1992 | Simmons |
| 5,208,906 | A | | 5/1993 | Morgan |
| 5,433,483 | A | | 7/1995 | Yu |
| 5,649,216 | A | | 7/1997 | Sieber |
| 5,737,440 | A | | 4/1998 | Kunkler |
| 5,877,819 | A | | 3/1999 | Branson |
| 5,883,639 | A | | 3/1999 | Walton et al. |
| 5,890,130 | A | * | 3/1999 | Cox et al. ............... 705/7.27 |
| 5,903,881 | A | * | 5/1999 | Schrader et al. ............ 705/42 |
| 6,052,486 | A | | 4/2000 | Knowlton et al. |
| 6,084,598 | A | | 7/2000 | Chekerylla |
| 6,133,915 | A | * | 10/2000 | Arcuri et al. ............... 715/779 |
| 6,141,008 | A | | 10/2000 | Bloomfield |
| 6,181,383 | B1 | | 1/2001 | Fox et al. |
| 6,181,838 | B1 | | 1/2001 | Knowlton |
| 6,195,452 | B1 | | 2/2001 | Royer |
| 6,243,721 | B1 | | 6/2001 | Duane et al. |
| 6,356,279 | B1 | | 3/2002 | Halstead, Jr. et al. |
| 6,380,940 | B1 | | 4/2002 | Halstead, Jr. et al. |
| 6,392,673 | B1 | | 5/2002 | Andrew et al. |
| 6,396,500 | B1 | | 5/2002 | Qureshi et al. |
| 6,456,305 | B1 | | 9/2002 | Qureshi et al. |

(Continued)

OTHER PUBLICATIONS

Intuit Canada Ltd.Startup Guide: QuickBooks Basic for Windows QuickBooks Pro for Windows QuickBooks Premiere for Windows. 1st ed. Alberta, Canada: 2002 <http://anon.intuit-canada.speedera.net.edgesuite.net/anon.intuit-canada/supportca/qbmo_extras/QuickBooks_StartupGuide2003.pdf> pp. 49-54, 81, 85.*

(Continued)

*Primary Examiner* — Beth V Boswell
*Assistant Examiner* — Renae Feacher
(74) *Attorney, Agent, or Firm* — Osha • Liang LLP

(57) ABSTRACT

Systems and methods provide access to features of a business management application at a contextually relevant locations within a global workflow. The system gathers data from various application features and user preferences and generates a global workflow diagram reflecting these data. The system and method provide contextual access to various features of the business management application, by way of nodes associated with their contextual location within the global workflow, allowing the user to view the information in its relevant context.

16 Claims, 15 Drawing Sheets

U.S. PATENT DOCUMENTS

| | | | |
|---|---|---|---|
| 6,473,093 | B1 | 10/2002 | Halstead, Jr. et al. |
| 6,504,544 | B1 | 1/2003 | Hollingsworth et al. |
| 2002/0040312 | A1* | 4/2002 | Dhar et al. .................. 705/8 |
| 2002/0091697 | A1* | 7/2002 | Huang et al. ................ 707/10 |
| 2002/0152098 | A1* | 10/2002 | Evans et al. .................. 705/4 |
| 2002/0186254 | A1* | 12/2002 | Monbaron ................. 345/810 |
| 2003/0097361 | A1* | 5/2003 | Huang et al. ................ 707/10 |
| 2003/0225638 | A1* | 12/2003 | Secola ........................ 705/30 |
| 2005/0256797 | A1* | 11/2005 | Tyulyaev .................... 705/37 |
| 2006/0259524 | A1* | 11/2006 | Horton ...................... 707/201 |

OTHER PUBLICATIONS

Biafore, Bonnie. QuickBooks 2005 The Missing Manual. California:O'Reilly Media Inc., 2005, p. 184.*

Biafore, Bonnie. QuickBooks 2005 The Missing Manual. California:O'Reilly Media Inc., 2005.*

Boudreau, John."Microsoft Introduces New Suite." San Jose Mercury News, CA, 2005, Dialog.*

Muse, Dan, and Lauren Simonds. "Quickbooks 2006 Promises Simplicity and Speed." Small Business Computing (2000) (2005): N.PAG. Internet and Personal Computing Abstracts. Web. Jan. 29, 2012.*

Yakal, Kathy. "Quickbooks 2006 Makes Huge Strides." PC Magazine 24.23 (2005): 39-414. Computer Source. Web. Jan. 29, 2012.*

Johnston, Randy. "Small Business Accounting Is Changing." CPA Technology Advisor 15.3 (2005): 34. Business Source Complete. Web. Jan. 29, 2012.*

Johnston, Randy and Sleeter, Doug."The Battle Begins Recommending the right small business Accounting solutions to your client." Oct. 2005.*

Ivens, Kathy. QuickBooks® 2004 The Official Guide. McGraw-Hill:California, 2004.*

Oktem, B., "Intuit Launches QuickBooks 2006," CDN, www.ITBusiness.ca, pp. 16, Nov. 18, 2005.

Morochove, R., "QuickBooks 2006 Boosts Power Features", PC World, Feb. 2006, 2 pages, vol. 52, No. 1, The Gale Group.

Morochove, R., "First Look: Microsoft Office Small Business Accounting, Software Giant Tailors New Version of Office Suite for Small-Business Users," PC World, Nov. 5, 2004, [online] [Retrieved from the Internet<URL:http://www.pcworld.com/news/article/0,aid,118495,00.asp>.

* cited by examiner

FIG. 12

CONTEXTUAL ACCESS TO WORKFLOW FUNCTIONALITY

RELATED APPLICATIONS

This application is related to U.S. patent application Ser. No. 11/386,228 filed on Mar. 21, 2006, entitled "Line Trimming and Arrow Head Placement Algorithm," which is incorporated herein in its entirety by reference.

BACKGROUND

The present invention relates to providing access to software application functionality in the context of the global workflow. Business and financial management applications are widely used to record, track, and analyze various types of personal, business, and financial data.

Many users of business and financial software applications think about their finances globally, in terms of all inflows, outflows, and transactions with entities involved with their businesses. However, the configuration of existing business and financial software applications does not always align with this mental model.

For example, existing business and financial software applications often restrict the configuration of the application to a set of predetermined configuration choices. This approach limits the utility of the application for the user, because the user's business or personal practices may not fit into any of the predetermined configurations, and this approach limits flexibility for later changes or growth.

In addition, existing business and financial software applications section information corresponding to different features within the global workflow into separate screens. While this organization focuses attention the feature of the application in use, it requires the user to navigate to multiple windows of the application to understand how the information is integrated with respect to the global workflow as a whole.

SUMMARY

In various embodiments, the present invention provides methods and systems for accessing features of a software application at contextually relevant locations within a global workflow and for creating a diagram of the global workflow. The system includes a user interface for receiving input and displaying a global workflow diagram according to user preferences. The system and method allow the user to customize a global workflow diagram and select which features are displayed in the custom diagram. In addition, the system is configured to provide access to various features of the business management application from nodes associated with their contextual location within the global workflow, e.g., by displaying user interface elements associated with the features. As a result, the user can readily ascertain the significance or status of the task or information of the feature in context.

The description in the specification is not all inclusive and, in particular, many additional features will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 12 is a business management application help window according to one embodiment.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The methods and systems for accessing features at contextually relevant locations within a global workflow and for creating a diagram of the global workflow are described herein in the context of a business management application. However, the methods and systems of the present invention may be used in the context of workflows associated with personal, business, and/or financial data.

Figure 1:
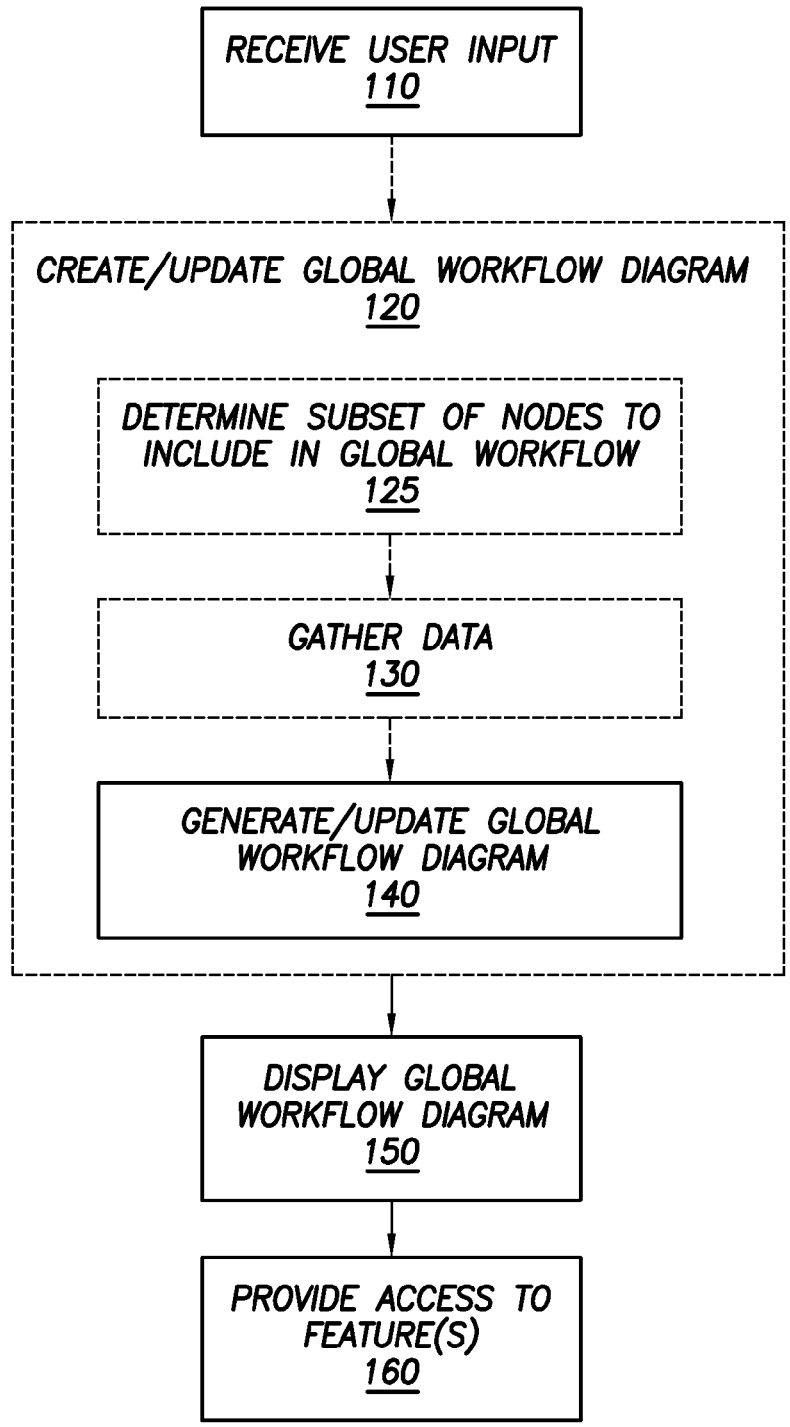
FIG. 1 is a flowchart illustrating a method of accessing a feature of a business management application at a contextually relevant place within a global workflow according to one embodiment of the present invention.

FIG. 1 is a flowchart illustrating a method of accessing a feature of a business management application at a contextually relevant place within a global workflow according to one embodiment of the present invention.

The method begins with receiving 110 user input indicating preferences for the global workflow diagram. In one embodiment, the preferences correspond to features of the business management application, which are associated with nodes of the global workflow diagram. As used herein, features include tasks, processes, or information associated with a business management application.

Figure 11:
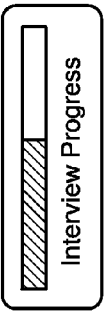
FIG. 11 is an example of a portion of a set of questions for initial display preferences for a business management application.

In one embodiment, selection takes place using a set of questions upon first installation of the business management application. An example of a page displaying a portion of the set of questions is shown in FIG. 11, described in greater detail below. In another embodiment, the preferences are set using a window such as described in conjunction with FIG. 5, or on a home page such as described in conjunction with FIG. 7. In yet another embodiment, a combination of these examples is used. Thus, in one embodiment, the user can select an initial set of preferences, and later can update the preferences.

In one embodiment, preferences are established in conjunction with a company file, such that multiple users of the same company file will see the same global workflow diagram. The set of preferences for selection by the user correspond to the set of all possible features of the business management application.

In some embodiments, multiple versions of the business management application are available, and the set of available features and corresponding preferences are defined by which version the user is running.

After preferences are received, the system creates 120 (or updates) a global workflow diagram. If the user has selected to show all features, the global workflow diagram displayed to the user includes all nodes corresponding to features of the application according to one embodiment, e.g., as described in conjunction with FIGS. 3A and 10. In another embodiment, the user can opt to skip the preferences step, and the system defaults to including all nodes in the global workflow diagram. If the preferences received 110 are an update from an initial set of preferences (or a default), then the global workflow diagram is updated 120 rather than created.

In one embodiment, creating 120 the global workflow diagram further comprises determining 125 a subset of nodes to include in the global workflow diagram, gathering 130 data associated with the subset, and generating 140 (or updating) the global workflow diagram from the data.

Thus, in one embodiment the system determines 125 a subset of nodes to include in the global workflow diagram using the preferences from step 110. This step is subtractive in one embodiment, i.e., the system takes all available features and nodes and subtracts from those any features the user deselected to determine whether each feature should be active and shown as nodes in the global workflow diagram.

Next the system gathers 130 data from the business management application associated with the selected features according to one embodiment. In this example, the system gathers information about the selected features to see if additional data is available for display, e.g., as action items as described in conjunction with FIG. 9. In another embodiment, the data is tied in with the various features, and thus setting the preferences establishes the link between the node and the feature. In this example, data may or may not need to be gathered from the features.

In one embodiment, the system then generates 140 the global workflow diagram using the preferences and gathered data, if any. In another embodiment, the global workflow diagram is updated 140, e.g., if the preferences were updated in step 110.

In an embodiment in which the system takes all available features and nodes and subtracts from those any features the user deselected, the global workflow diagram uses a complete template showing all available nodes, from which nodes are removed according to user preferences.

In an embodiment in which preferences were updated in step 110, the global workflow diagram is correspondingly updated 140.

Figure 3A:
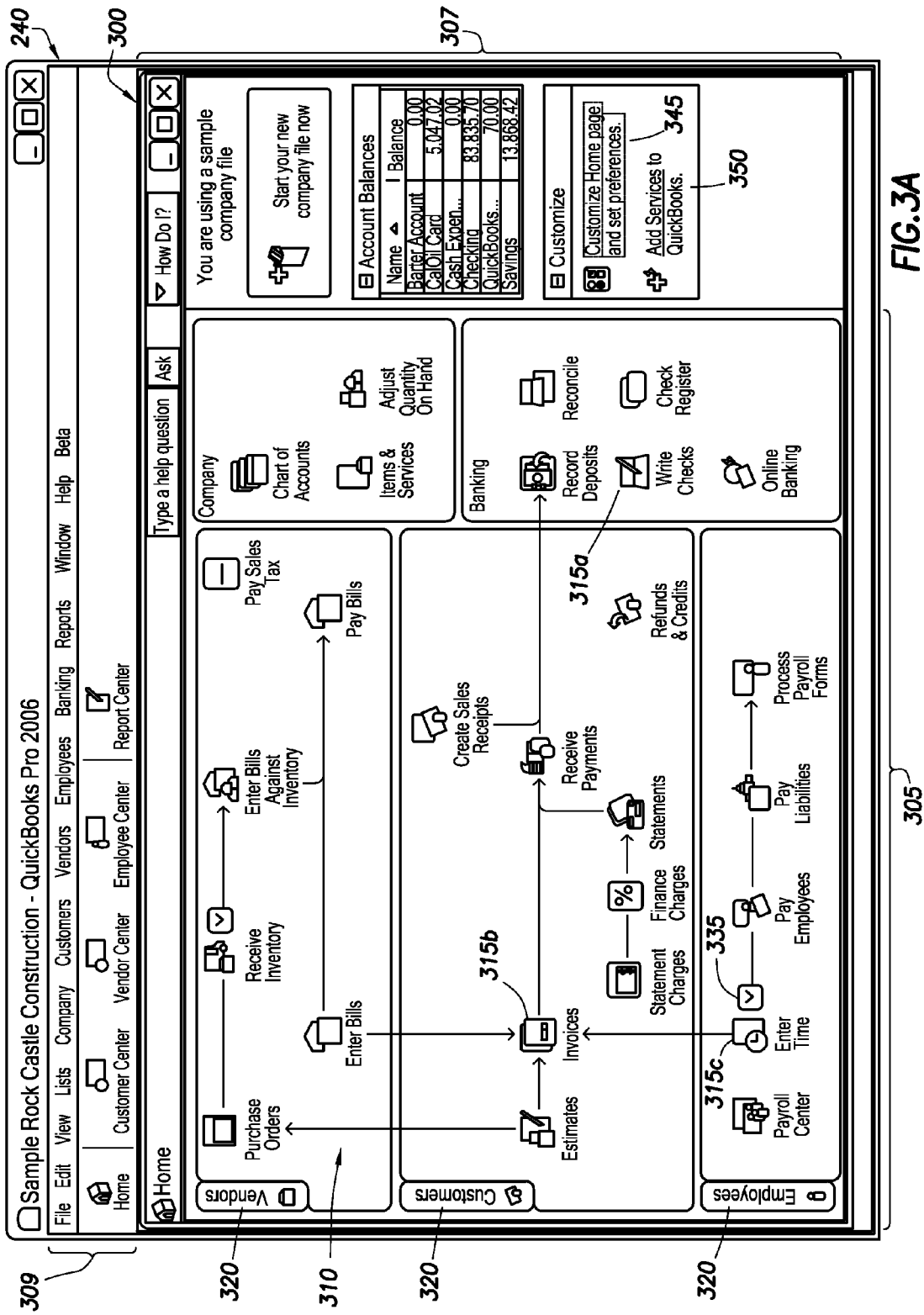
FIG. 3A is a business management application home page showing one embodiment of a global workflow diagram.
Figure 3B:
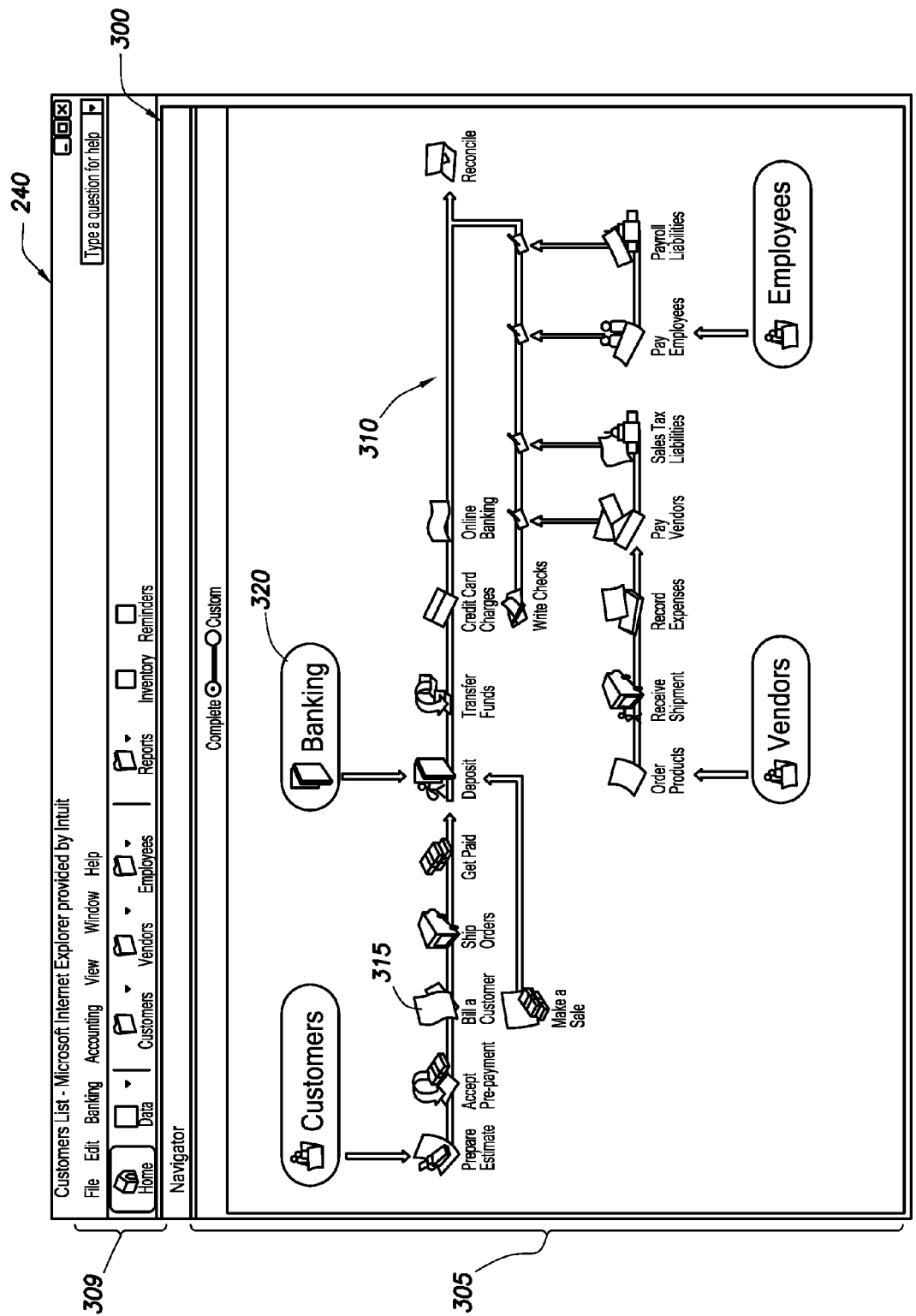
FIG. 3B is a business management application home page showing another embodiment of a global workflow diagram.

Next, the system displays 150 to the user a global workflow diagram as created by the system according to one embodiment, for example, as a home page of the application. One embodiment of a global workflow diagram 310 is shown in FIG. 3A. Another embodiment of a global workflow diagram 310 is shown in FIG. 3B. FIGS. 3A and 3B are examples of complete templates, for which all features were selected for display, thus all nodes are shown.

The system also provides 160 access to features of the business management application via the global workflow diagram, for example via nodes associated with the features. In one embodiment, the nodes appear at contextually relevant places within the global workflow, such that the user can readily ascertain the significance of the task or information of the feature in context. Examples of nodes 315 are shown in the embodiments depicted in FIGS. 3A and 3B. In response to a user clicking on a node, the system provides access to the associated feature in one embodiment, for example by displaying a user interface element with information or to accomplish a task associated with the feature.

Figure 2:
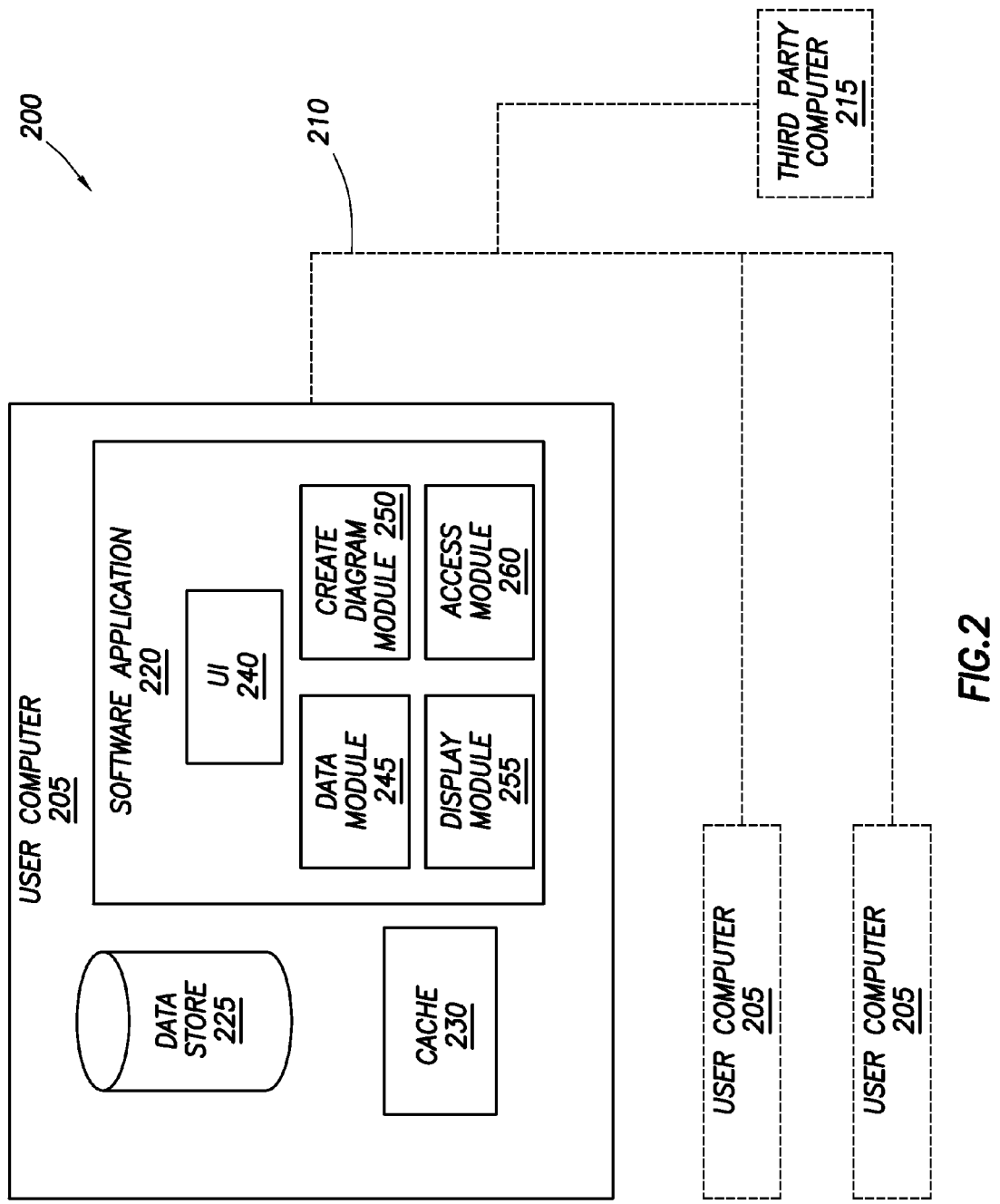
FIG. 2 is a block diagram illustrating the architecture of one embodiment of a system useful for supporting the method of FIG. 1 according to one embodiment of the preset invention.

FIG. 2 is a block diagram illustrating the architecture of one embodiment of a system 200 useful for supporting a software application 220 for accessing a feature at a contextually relevant place within a global workflow and for creating a global workflow. In such a system 200, there is provided at least one user computing system 205, which may be a stand-alone device or may be communicatively coupled to a network 210 and/or one or more third party computing systems 215, as indicated by dotted lines.

The user computing system 205 is of conventional design, and includes a processor, an addressable memory, and other conventional features (not illustrated) such as a display, local memory, input/output ports, and a network interface. In other embodiments one or more of the components of the user computing system 205 may be located remotely and accessed via a network. The network interface and a network communication protocol provide access to a network and other computing systems, such as other user computing systems 205 or third party computing systems 215, along with access to the Internet, via a TCP/IP type connection, or to other network embodiments, such as a LAN, a WAN, a MAN, a wired or wireless network, a private network, a virtual private network, via other networks, or other systems allowing for data communication between two or more computing systems. In various embodiments the user computing system 205 may be implemented on a computing system running a Microsoft operating system, Mac OS, various flavors of Linux, UNIX, Palm OS, and/or other operating systems.

The third party computing systems 215, if present, also may be computing systems similar to the user computing system described above. For example, one embodiment of a third party computing system 215 is a financial institution computer system. In this embodiment, the software application 220 described herein may be a business management software package capable of communicating with the financial institution computer system to access information from pre-existing user accounts (e.g., obtain account balances to determine available funds), and provide payment instructions for making payments to vendors.

The user computing system 205 includes a software application 220, data store 225, and data cache 230. The software application 220 is comprised of a number of executable code portions and data files. These include code for creating and supporting a user interface 240 according to one embodiment of the present invention, as well as for supporting a method of accessing a feature of a business management application at a contextually relevant place within a global workflow and/or creating a global workflow. In other embodiments, the software application 220 can be implemented as a stand-alone application outside of a business management software package.

The software application 220 is responsible for orchestrating the processes performed according to the methods of the present invention. The software application 220 includes a data module 245, a workflow state module 250, a create diagram module 255, a display module 260, and an access module 265 according to one embodiment of the present invention.

The data module 245 enables the system 200 to receive user input specifying feature display preferences, and is one means for so doing according to one embodiment. In addition, the data module 245 enables the system to gather data from features in one embodiment, and is one means for so doing.

The create diagram module 250 enables the system 200 to create a global workflow diagram, and is one means for so doing. In one embodiment, the create diagram module 255 creates a global workflow diagram for the home page of a business management application 220, e.g., as shown in FIGS. 3A and 3B.

In one embodiment, the create diagram module 250 allows the system to determine a subset of nodes to include in the global workflow diagram, to gather data associated with the subset, and to generate and update the global workflow diagram as described in conjunction with FIG. 1, and is one means for so doing. In this example, the create diagram module 250 enables the system 200 to determine whether the various nodes of a global workflow diagram should be shown.

The display module 255 enables the system 200 to display the global workflow diagram, and is one means for so doing. In one embodiment, the displaying is as described in conjunction with step 150 of FIG. 1. The display includes a plurality of nodes corresponding to features of the software application 220 at contextually relevant places within the global workflow diagram according to one embodiment.

The access module 260 enables the system 200 to provide access to a feature corresponding to a node selecting by a user, and is one means for so doing. For example, access to a feature includes displaying a user interface element with information, or to accomplish a task, associated with the feature according to one embodiment. The user interface element is a window in one embodiment, e.g., that overlays the global workflow diagram. The access module 260 is one means for displaying a user interface element associated with a feature in response to user input selecting a corresponding node from a plurality of nodes.

The above software portions 240-260 need not be discrete software modules. The software configuration shown is meant only by way of example; other configurations are contemplated by and within the scope of the present invention.

The software application 220 may be provided to the user computing system 205 on a computer readable media, or by electronic communication over a network, e.g., 210, from one of the third party computing systems 215 or other distributors of software, for installation and execution thereon. Alternatively, the software application 220, data store 225, and data cache 230 can be hosted on a server computing system, and accessed over the network 210 by the user, using for example a browser interface to the software application 220.

The data store 225 may be a relational database or any other type of database that stores the data used by the software application 220, for example account information in the business management application embodiment referenced herein. The data store 225 may be accessible by the software application 220 through the user interface 240. Some data from the data store 225 may be added to the data cache 230 upon initialization of the software application 220. The software application 220 and the data store 225 may be stored and operated on a single computing system or on separate computer systems communicating with each other through a network 210.

The data cache 230 is a standard cache of small, fast memory holding recently accessed data.

One skilled in the art will recognize that the system architecture illustrated in FIG. 2 is merely exemplary, and that the invention may be practiced and implemented using many other architectures and environments.

User Interface Control

In the embodiment shown in the following figures, the user interface 240 is provided as part of a business management application, a portion of which is shown in figures. In other embodiments, user interfaces 240 associated with other types of applications are used. The particular screen layouts, appearance, and terminology as depicted and described herein, are intended to be illustrative and exemplary, and in no way limit the scope of the invention as claimed.

FIG. 3A is a screenshot illustrating a home page 300 of a business management application 220 according to one embodiment of the present invention. The home page 300 is displayed, in one embodiment, in response to the system having gathered preferences and data from the business management application 220, as discussed in conjunction with FIG. 1. The home page 300 includes a workflow diagram area 305, an auxiliary function area 307, and a domain bar 309 according to one embodiment. In another embodiment, such as shown in FIG. 3B, the auxiliary function area 307 may be absent from the home page 300. The workflow diagram area 305 provides access to features of the business management application 220 at contextually relevant places within a global workflow. The auxiliary function area 307 provides quick access to account balances and display customization and preference options. The domain bar 309 provides access to information and features associated with the respective domains 320.

The home page 300 is one means for displaying the global workflow diagram 310. The workflow diagram area 305 displays to the user a global workflow diagram 310. The global workflow diagram 310 illustrates the various features associated with the business management application 220, and includes nodes 315 associated with features of the business management application 220. The nodes 315 are placed at contextually relevant places within the global workflow diagram 310 according to one embodiment.

In the embodiment shown in FIG. 3A, the nodes 315 are sectioned by the domain 320 to which they correspond, e.g., vendors, customers, and employees. The nodes 315 within a selected domain 320 can be understood as a flow diagram for features within the domain. Thus, the global workflow diagram 310 integrates the nodes 315 in the domains 320 such that the entire global workflow can be visualized. In another embodiment, domains 320 are displayed, however, the nodes 315 are not sectioned. An embodiment of a screenshot illustrating another home page 300 without sectioning applied to the global workflow diagram 310 is shown in FIG. 3B.

Figure 3C:
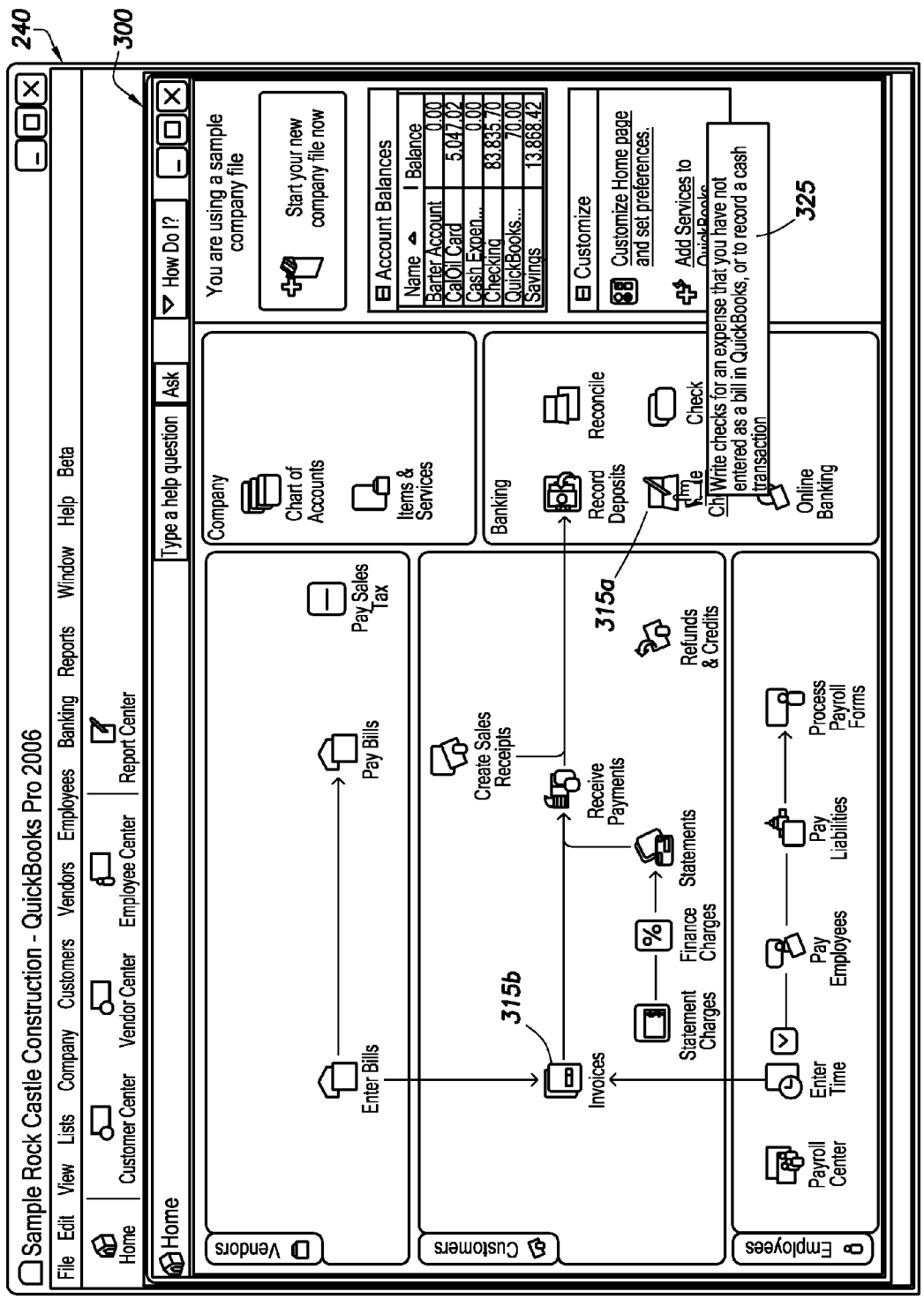
FIG. 3C is a business management application home page illustrating tooltip functionality according to one embodiment.
Figure 3D:
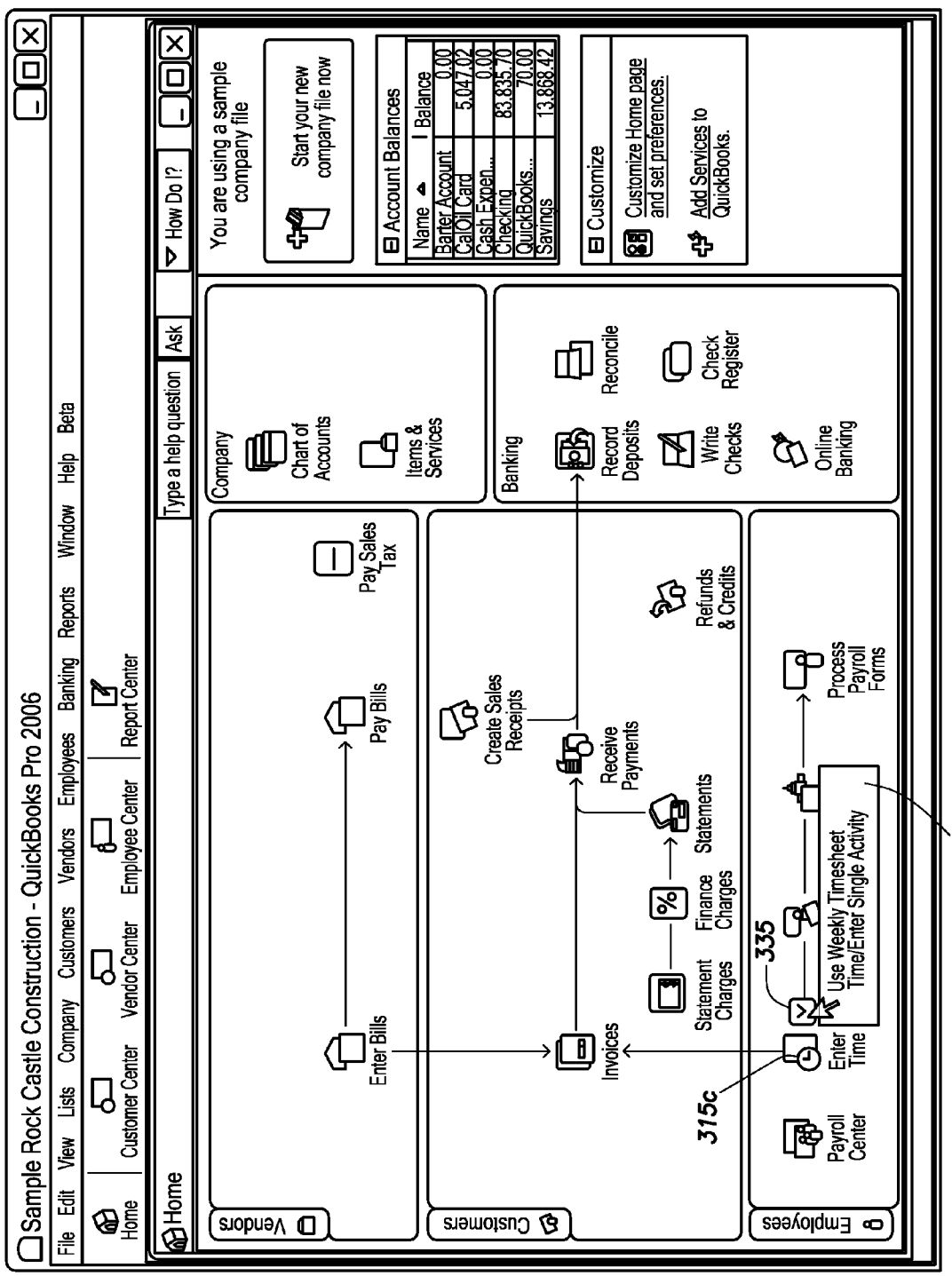
FIG. 3D is a business management application home page illustrating supercommand functionality according to one embodiment.
Figure 4:
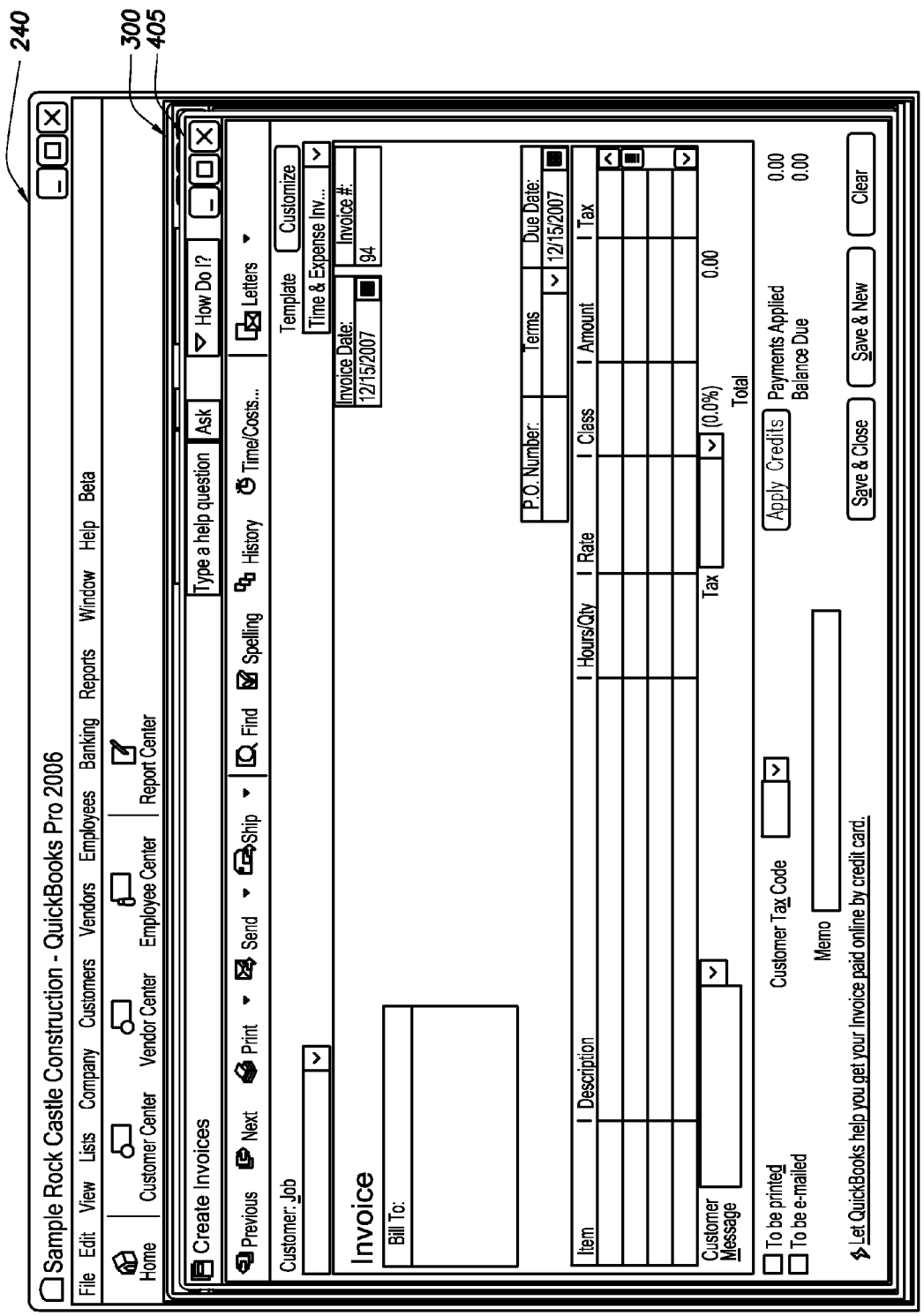
FIG. 4 is a business management application create invoice page according to one embodiment.

Each node 315 is associated with a feature of the business management application 220. In one embodiment, features include tasks such as creating sales receipts and processing payroll forms, as well as data, such as banking or payroll information. Mousing over a node 315 displays to the user greater detail about the function of the node 315 in one embodiment. For example, node 315 detail may be provided through a pop up 325 using tooltip functionality as shown for writing checks node 315a in FIG. 3C. Selecting a node 315, e.g., by double-clicking on the node 315 icon provides access to the feature associated with the icon 315 according to one embodiment. For example, clicking the invoices icon 315b opens a new window 405 over the home page 300, as shown in FIG. 4, which allows the user to create a new invoice. A window, such as new window 405, is one means for displaying a user interface element associated with a feature in response to user input selecting a corresponding node 315 from a plurality of nodes. Some nodes 315 collect multiple closely-related features into a supercommand node. The enter time node 315c is a supercommand node as depicted in FIG. 3A. Supercommand node icons include a dropdown arrow 335, indicating that more than one feature is associated with the node 315. Upon clicking the dropdown arrow 335, a pop up 340 opens displaying the list of features associated with the node 315, e.g., Use Weekly Timesheet and Time/Enter Single Activity, as shown in FIG. 3D. Selecting the feature then opens a new window to the feature such as described in conjunction with FIG. 4.

The auxiliary function area 307 includes a customization icon 345 and an add services icon 350. The customization icon 345 allows for customization of the global workflow diagram 310 on the home page 300. The add services icon 350 provides for additional functionality for the business management application 200, such as online banking, assisted payroll, or merchant account services for credit card processing.

Figure 5:
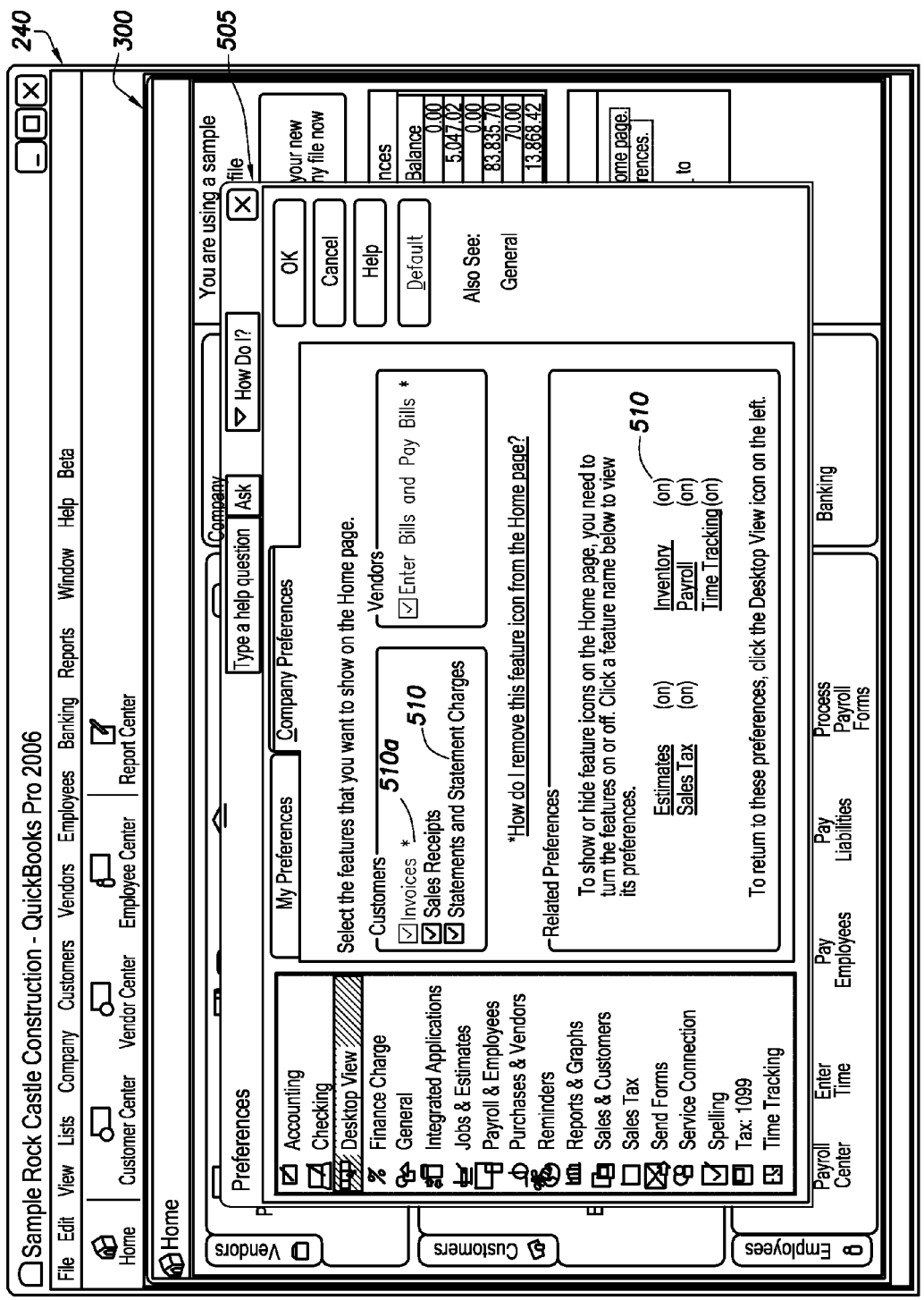
FIG. 5 is a business management application preferences window according to one embodiment.

Selection of the customization icon 345 opens a preferences window 505 over the home page 300, as shown in FIG. 5 according to one embodiment. The preferences window 505 provides for turning on or off various features 510 according to business needs. By default, all features 510 are turned on and the global workflow diagram 310 displays all nodes 315 according to one embodiment, as shown in FIGS. 3A and 3B. If some features 510 are turned off, e.g., because they will not be used, the global workflow diagram 310 does not display the nodes 315 associated with the deselected features 510. In one embodiment, preferences are established in conjunction with a company file, such that multiple users of the same company file will see the same global workflow diagram 310.

In one embodiment, the user can set an initial set of preferences using a set of interview questions in the initial start up of the application 220. FIG. 11 shows an example of one such question step. One embodiment includes several such pages, each pertaining to a feature of the application 220. In the embodiment shown, the system recommends options to the user.

Figure 6:
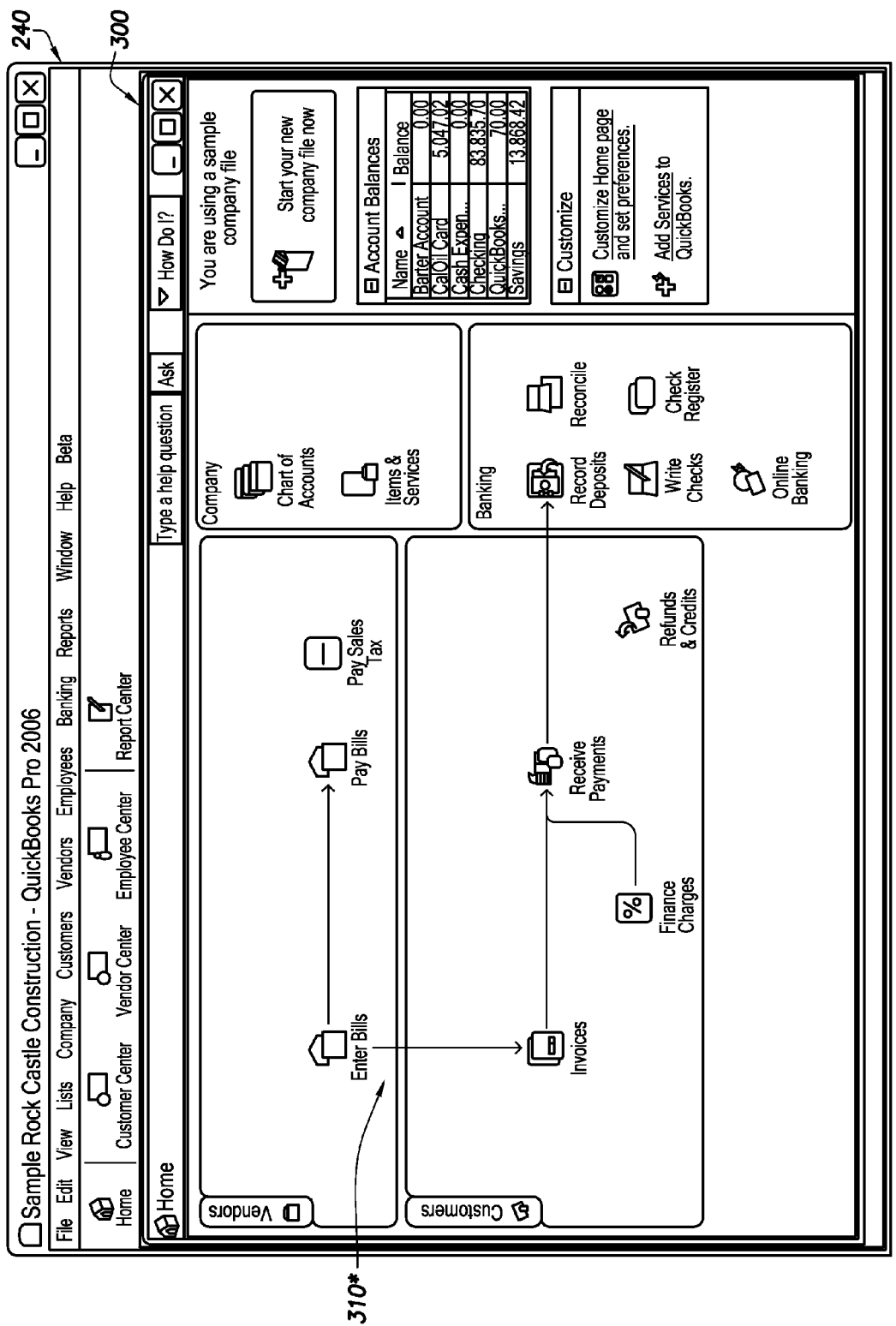
FIG. 6 is a business management application home page showing a customized global workflow diagram according to one embodiment.
Figure 7:
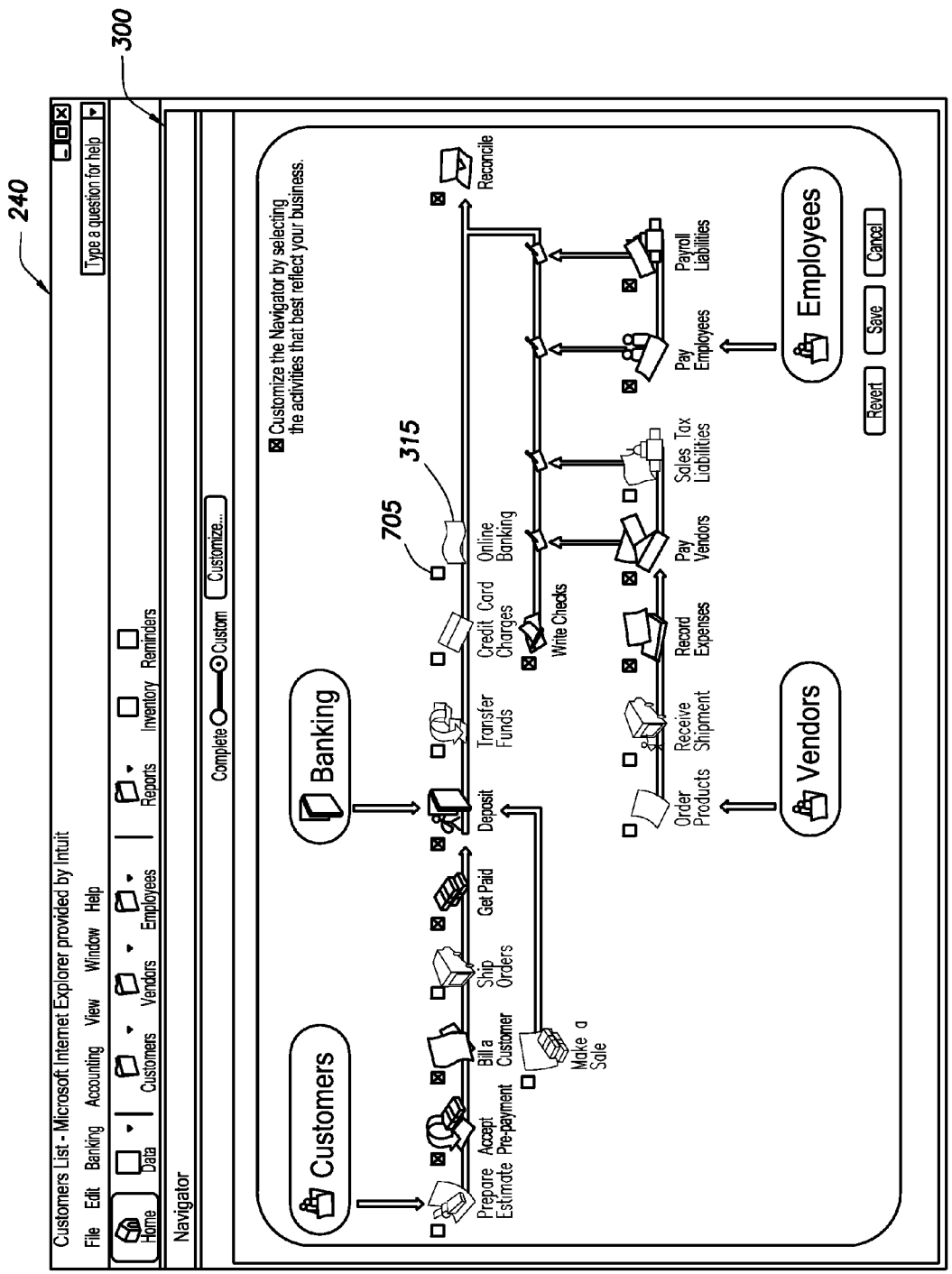
FIG. 7 is a business management application home page showing one embodiment of customization of a global workflow diagram.
Figure 12:
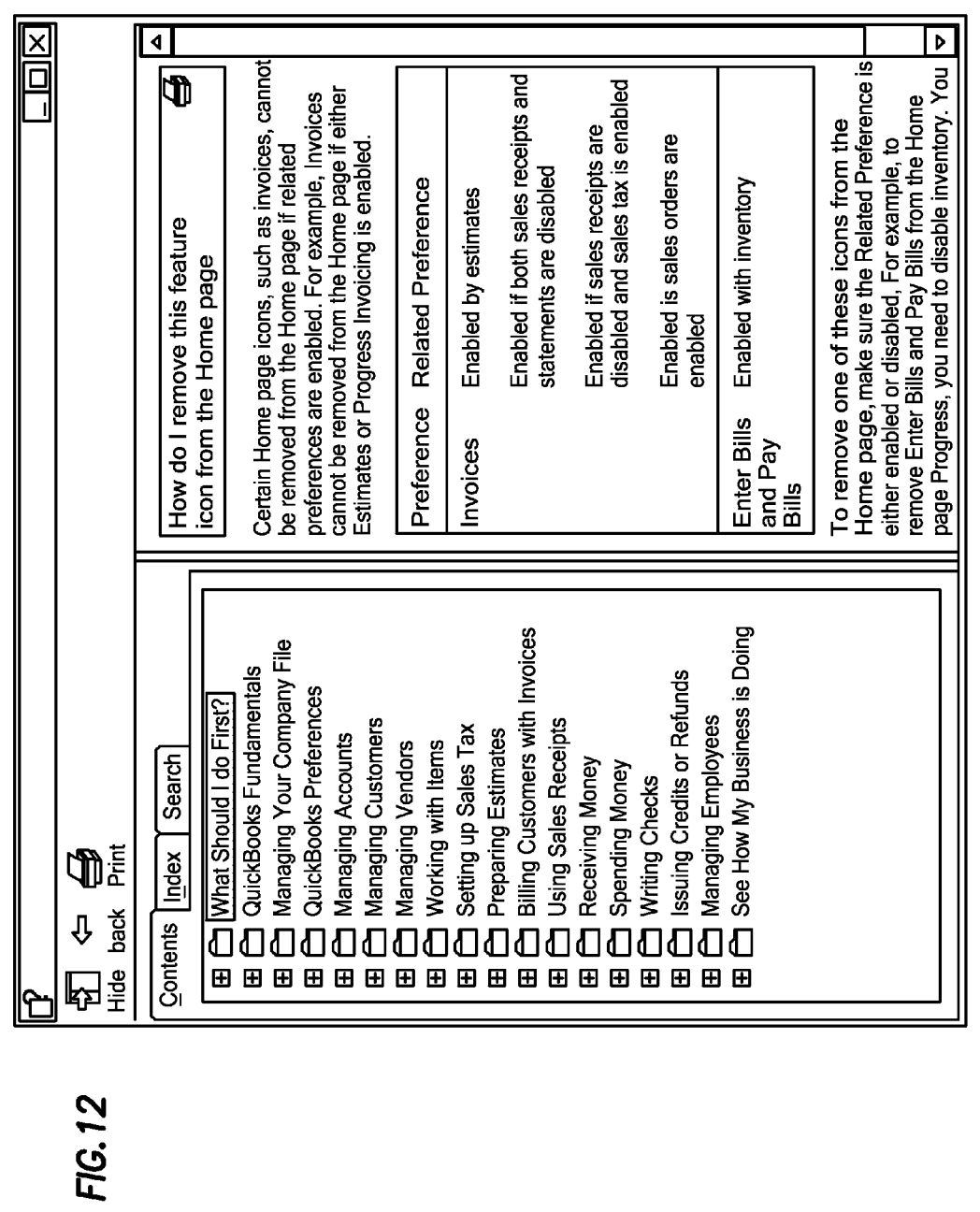

An example of a home page 300 with a customized global workflow diagram 310* showing less than all of the nodes 315 is shown in FIG. 6. In one embodiment, some features, e.g., 510a of FIG. 5, cannot be turned off using the preferences window 505. These features are interrelated with other features and affect the display of the other features in one embodiment, and thus they have separate considerations. For these features, a help screen, such as shown in FIG. 12, may be displayed to assist the user in set up of these features. In another embodiment, the global workflow diagram 310 can be customized on the diagram itself, e.g., by selecting and deselecting checkboxes 705 associated with nodes 315 on the home page 300, as shown in FIG. 7.

Figure 8:
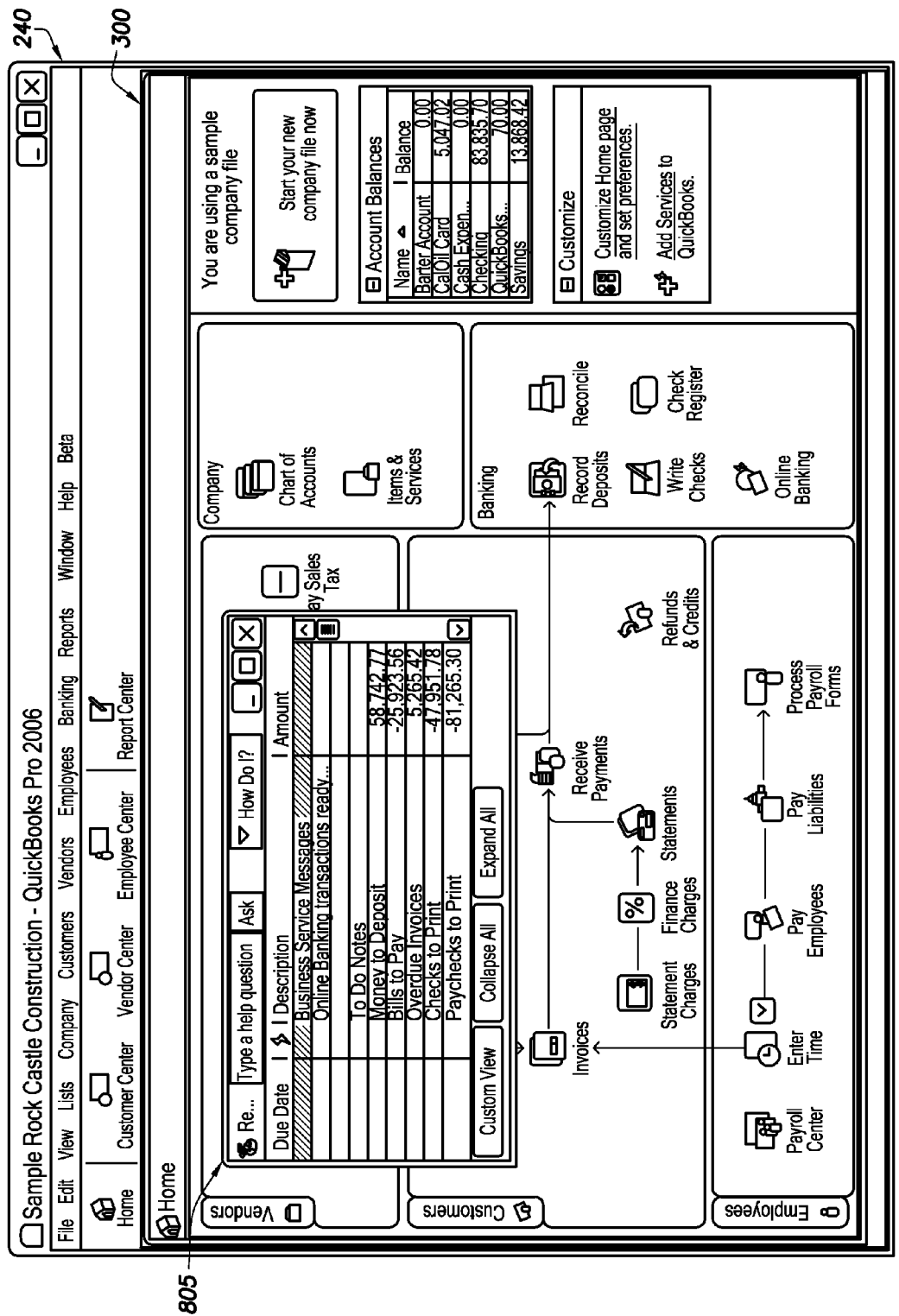
FIG. 8 is a business management application home page showing a reminders window according to one embodiment.
Figure 9:
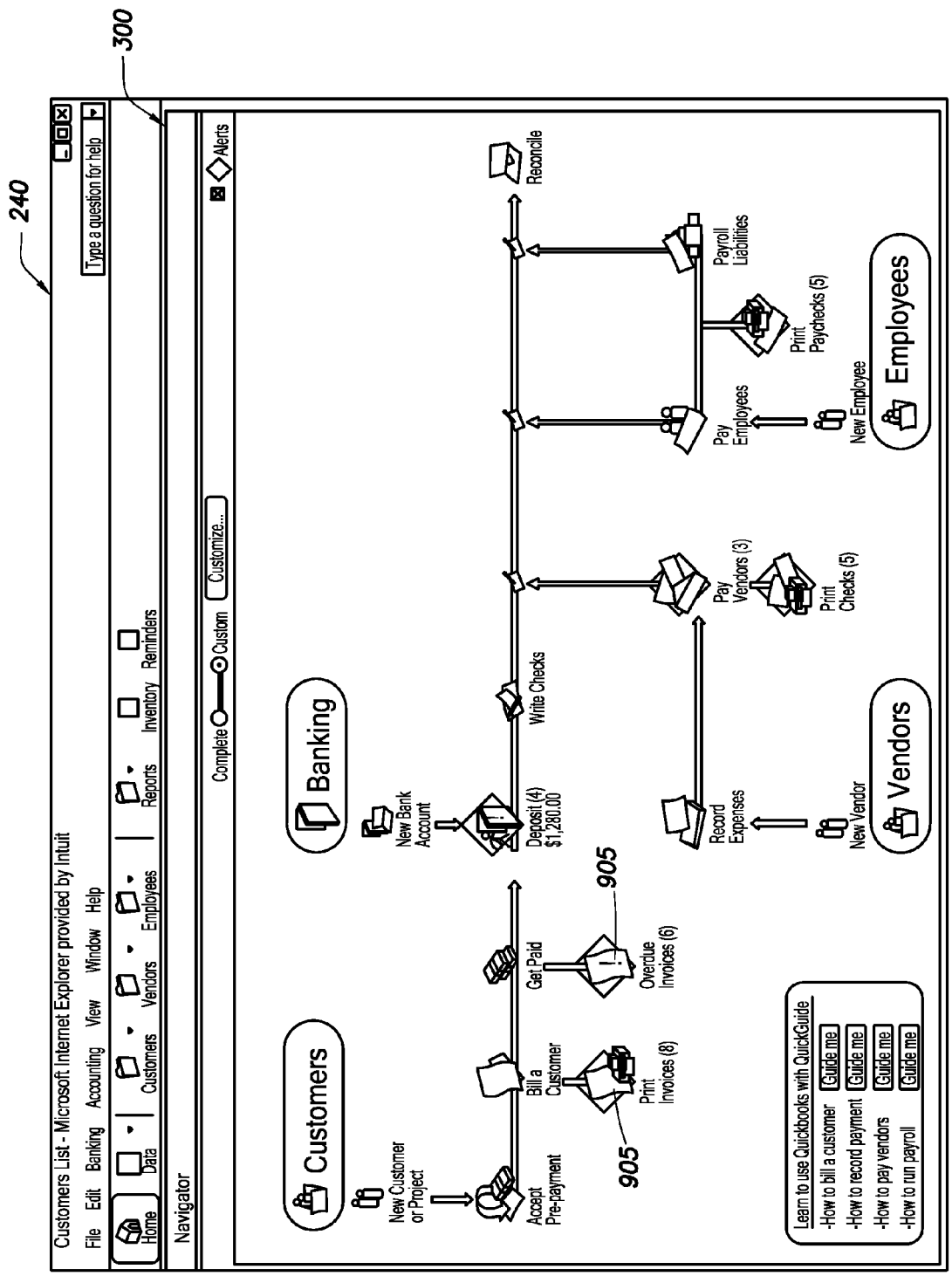
FIG. 9 is a business management application home page showing reminders displayed on a global workflow diagram according to one embodiment.

In one embodiment, features of the business management application 200 produce reminders on the home page 300 for items that need attention, e.g., for overdue invoices. FIG. 8 shows one embodiment in which a reminders window 805 is shown over the home page 300. This example lists multiple features with action items, e.g., bills to pay, overdue invoices, and checks to be printed. In another embodiment, reminders 905 are displayed on the global workflow diagram 310, e.g., as shown in FIG. 9. In one embodiment, the reminders are generated based on data gathered from the features of the system, e.g., as described in conjunction with step 130 of FIG. 1.

Workflow

Figure 10:
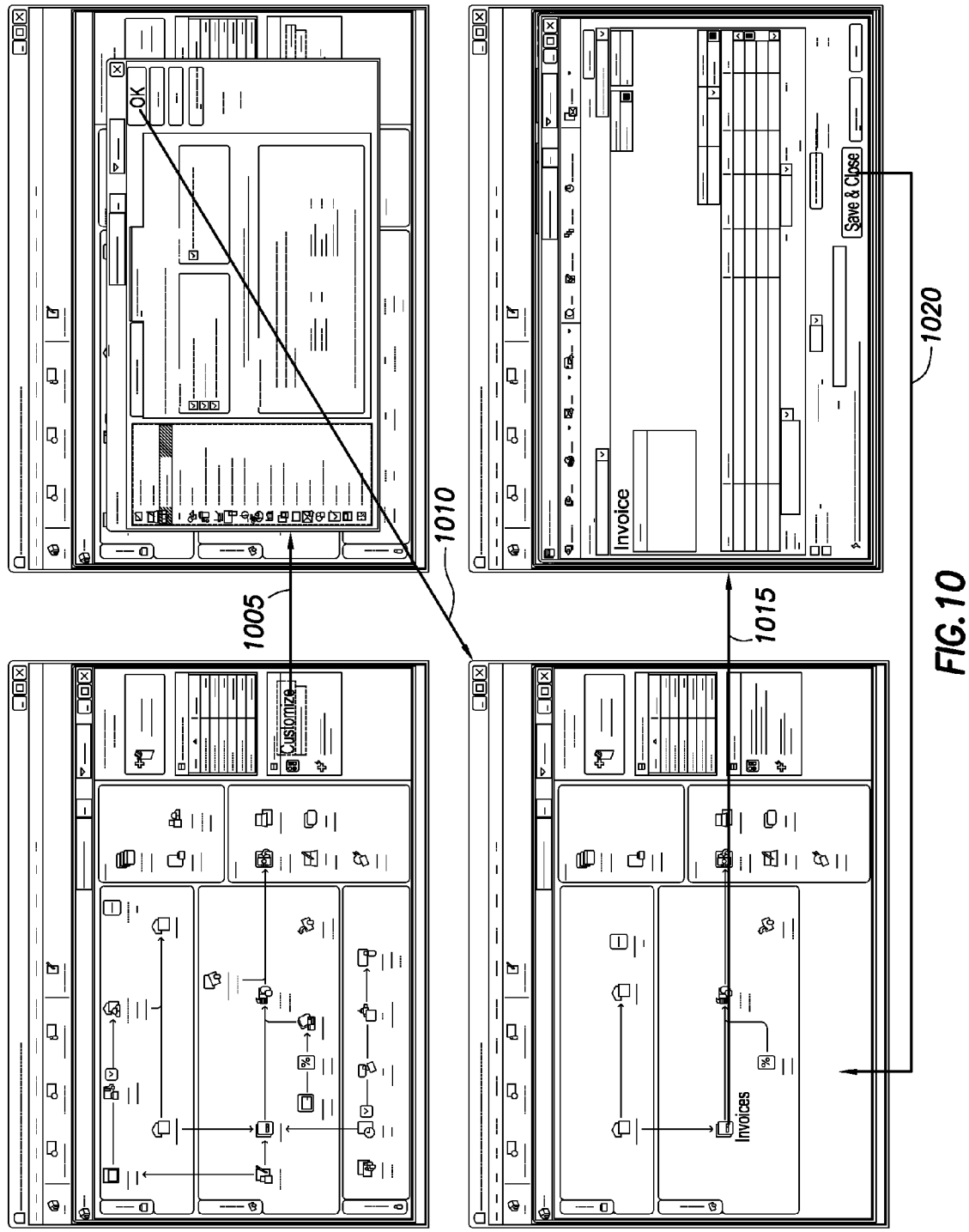
FIG. 10 is a diagram showing a user workflow according to one embodiment.

Referring to FIG. 10, in conjunction with FIGS. 3A and 4-6, the user workflow proceeds as follows according to one embodiment. The system gathers information as to which features of a business management application include data. Using this information, the home page 300 is displayed with a global workflow diagram 310 showing all nodes 315. Upon selection of the customization icon 345, a preferences screen 505 opens to allow selection (or deselection) of features 510. Once preferences have been set, the preferences screen 505 is closed, and an customized global workflow diagram 310* is shown reflecting the preferences selections. Upon selection of a node 315, e.g., invoices node 315b, window corresponding to the feature associated with the node 315 is opened, e.g., a blank invoice.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computing system selectively activated or reconfigured by a computer program stored on a computer readable medium that can be accessed by the computing system. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computing systems referred to in the specification may include a single processor or may be architectures employing multiple processor designs for increased computing capability.

The algorithms and operations presented herein are not inherently related to any particular computing system or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computing systems that are communicatively coupled to dissimilar computing systems and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of accessing features of a business management application (BMA), the method comprising:
   generating, by a hardware processor and for a user, a single global workflow diagram (GWD) comprising a vendor domain having a plurality of vendor nodes arranged in a vendor workflow, a customer domain having a plurality of customer nodes arranged in a customer workflow, an employee domain having a plurality of employee nodes arranged in an employee workflow, and a plurality of checkboxes corresponding to and positioned adjacent to the plurality of vendor nodes, the plurality of customer nodes, and the plurality of employee nodes;
   generating, by the hardware processor, an auxiliary function area (AFA) comprising a customization icon and a plurality of account balances for a plurality of financial accounts controlled by the user;
   displaying, simultaneously and by the hardware processor, the single GWD and the AFA adjacent to the single GWD;
   identifying, by the hardware processor, a subset of the plurality of checkboxes selected by the user on the single GWD;
   identifying a checkbox of the plurality of checkboxes excluded from the subset;
   removing, by the processor, a customer node corresponding to the checkbox from the single GWD; and
   displaying, in response to user input selecting a node in the single GWD, a user interface element associated with a feature corresponding to the node.

2. The method of claim 1, wherein the plurality of vendor features includes tasks, processes, and information.

3. The method of claim 1, further comprising displaying a reminder for a vendor node in response to a change in a feature associated with the vendor node.

4. The method of claim 1, further comprising:
   receiving, from the user and after displaying the single GWD, a selection of a vendor node of the plurality of vendor nodes; and
   displaying, in response to the selection of the vendor node, a box overlapping a portion of the single GWD and comprising a description of a vendor feature corresponding to the vendor node.

5. The method of claim 1, wherein the user interface element comprises an invoice for completion by the user.

6. A computer readable storage medium storing instructions for accessing features of a business management application (BMA), the instructions comprising functionality to:
   generate, for a user, a single global workflow diagram (GWD) comprising a vendor domain having a plurality of vendor nodes arranged in a vendor workflow, a customer domain having a plurality of customer nodes arranged in a customer workflow, an employee domain having a plurality of employee nodes arranged in an employee workflow, and a plurality of checkboxes corresponding to and positioned adjacent to the plurality of vendor nodes, the plurality of customer nodes, and the plurality of employee nodes;
   generate an auxiliary function area (AFA) comprising a customization icon and a plurality of account balances for a plurality of financial accounts controlled by the user;
   display, simultaneously, the single GWD and the AFA adjacent to the single GWD;
   identify a subset of the plurality of checkboxes selected by the user on the single GWD;
   identify a checkbox of the plurality of checkboxes excluded from the subset;
   remove a customer node corresponding to the checkbox from the single GWD; and
   display, in response to user input selecting a node in the single GWD, a user interface element associated with a feature corresponding to the node.

7. The computer readable storage medium of claim 6, wherein the instructions further comprise functionality to display a reminder for a vendor node in response to a change in a feature associated with the vendor node.

8. The computer readable storage medium of claim 6, wherein the plurality of vendor features includes tasks, processes, and information.

9. The computer readable storage medium of claim 6, where the instructions further comprise functionality to:
   receive, from the user and after displaying the single GWD, a selection of a vendor node of the plurality of vendor nodes; and
   display, in response to the selection of the vendor node, a box overlapping a portion of the single GWD and comprising a description of a vendor feature corresponding to the vendor node.

10. The computer readable medium of claim 6, wherein the user interface element comprises an invoice for completion by the user.

11. A system for accessing features of a business management application (BMA), comprising:
- a processor;
- a memory operatively connected to the processor; and
- a plurality of instructions stored on the memory and comprising functionality to:
  - generate, for a user, a single global workflow diagram (GWD) comprising a vendor domain having a plurality of vendor nodes arranged in a vendor workflow, a customer domain having a plurality of customer nodes arranged in a customer workflow, an employee domain having a plurality of employee nodes arranged in an employee workflow, and a plurality of checkboxes corresponding to and positioned adjacent to the plurality of vendor nodes, the plurality of customer nodes, and the plurality of employee nodes;
  - generate an auxiliary function area (AFA) comprising a customization icon and a plurality of account balances for a plurality of financial accounts controlled by the user;
  - display, simultaneously, the single GWD and the AFA simultaneously adjacent to the single GWD;
  - identify a subset of the plurality of checkboxes selected by the user on the single GWD;
  - identify a checkbox of the plurality of checkboxes excluded from the subset;
  - remove a customer node corresponding to the customer feature checkbox from the single GWD; and
  - display, in response to user input selecting a node in the single GWD, a user interface element associated with a feature corresponding to the node.

12. The system of claim 11, wherein the instructions further comprise functionality to display a reminder for a vendor node in response to a change in a feature associated with the vendor node.

13. The system of claim 11, wherein the plurality of vendor features includes tasks, processes, and information.

14. The system of claim 11, wherein the instructions further comprise functionality to:
- receive, from the user and after displaying the single GWD, a selection of a vendor node of the plurality of vendor nodes; and
- display, in response to the selection of the vendor node, a box overlapping a portion of the single GWD and comprising a description of a vendor feature corresponding to the vendor node.

15. The system of claim 11, wherein the user interface element comprises an invoice for completion by the user.

16. The system of claim 11, wherein the instructions further comprise functionality to conduct an interview, wherein the plurality of selections is received during the interview.

* * * * *